(12) United States Patent
Jin et al.

(10) Patent No.: US 8,701,123 B2
(45) Date of Patent: Apr. 15, 2014

(54) APPARATUS AND METHOD FOR TRANSMITTING EVENTS OCCURRING IN A CONTROLLED DEVICE TO A CONTROL DEVICE IN A WEB BASED SYSTEM

(75) Inventors: Ho Jin, Yongin-si (KR); Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1669 days.

(21) Appl. No.: 11/526,746

(22) Filed: Sep. 26, 2006

(65) Prior Publication Data

US 2007/0106921 A1 May 10, 2007

Related U.S. Application Data

(60) Provisional application No. 60/720,045, filed on Sep. 26, 2005.

(30) Foreign Application Priority Data

May 16, 2006 (KR) .................. 10-2006-0043985

(51) Int. Cl.
*G06F 9/54* (2006.01)
(52) U.S. Cl.
USPC .......................................................... 719/318
(58) Field of Classification Search
USPC .......................................................... 719/318
See application file for complete search history.

(56) References Cited

U.S. PATENT DOCUMENTS

| | | | | |
|---|---|---|---|---|
| 6,185,613 B1 * | 2/2001 | Lawson et al. | ............... | 709/224 |
| 6,725,281 B1 * | 4/2004 | Zintel et al. | ................... | 719/318 |
| 2004/0088715 A1 * | 5/2004 | Korall et al. | ................... | 719/318 |
| 2004/0117858 A1 * | 6/2004 | Boudreau et al. | ............. | 725/144 |
| 2004/0158839 A1 * | 8/2004 | Lee | ............................... | 719/318 |
| 2004/0208117 A1 * | 10/2004 | Kim | ............................... | 370/216 |
| 2005/0193097 A1 | 9/2005 | Guthrie et al. | | |
| 2007/0180122 A1 * | 8/2007 | Barrett | ......................... | 709/227 |

FOREIGN PATENT DOCUMENTS

| | | |
|---|---|---|
| EP | 1 345 381 A2 | 3/2003 |
| JP | 2004-007347 A | 1/2004 |
| JP | 2004252974 A * | 9/2004 |
| KR | 10 2004 0103367 A | 12/2004 |
| KR | 10-2005-0079480 A | 8/2005 |

OTHER PUBLICATIONS

IEEE 100 The Authoritative Dictionary of IEEE Standards Terms, 7th Ed. (2000), Standards Information Network IEEE Press, pp. 398.*

(Continued)

*Primary Examiner* — H S Sough
*Assistant Examiner* — Brian W Wathen
(74) *Attorney, Agent, or Firm* — Sughrue Mion, PLLC (57) ABSTRACT

Provided are an apparatus and a method which can transmit an event having occurred in a controlled device to a control device without loss or delay in a web-based system. The apparatus includes an event occurrence detector which detects the occurrence of an event; an event storage unit which stores an occurred event; a response transmitter which transmits a first response including the occurred event to a control device according to a request of the control device; a time measurement unit which measures a time elapsed after the request or the response, and a control unit which transmits a second response to the control device, which selectively asks the control device to re-request a report of an occurred event according to the measured time.

23 Claims, 9 Drawing Sheets

(56) References Cited

OTHER PUBLICATIONS

Microsoft Computer Dictionary, 5th Ed. (2002), Microsoft Press, pp. 198-199.*

Fresmith, D.; Eykholt, E., "Dictionary of Object Technology", (1995), SIGS Books, Inc., pp. 161-162.*

Holt, W.; Morgan, R., "UNIX: An Open Systems Dictionary", (1994), Resolution Business Press, Inc., pp. 151.*

* cited by examiner

APPARATUS AND METHOD FOR TRANSMITTING EVENTS OCCURRING IN A CONTROLLED DEVICE TO A CONTROL DEVICE IN A WEB BASED SYSTEM

CROSS-REFERENCE TO RELATED APPLICATION

This application claims priority from Korean Patent Application No. 10-2006-0043985 filed on May 16, 2006 in the Korean Intellectual Property Office, and U.S. Provisional Patent Application No. 60/720,045 filed on Sep. 26, 2005 in the United States Patent and Trademark Office, the disclosures of which are incorporated herein by reference in their entirety.

BACKGROUND OF THE INVENTION

1. Field of the invention

Methods and apparatuses consistent with the present invention relate to transmitting an event in a web-based system, and more particularly, to an apparatus and method which can transmit an event having occurred in a controlled device to a control device without loss or delay in a web-based system.

2. Description of the Prior Art

According to the development of web technologies, the web is now utilized in various fields relating to web-based systems such as a home network for controlling home appliances including Audio Video (AV) appliances, beyond application to simple display of markup language documents such as Hyper Text Markup Language (HTML) documents.

For example, a current home network using the web may have a construction in which a digital television is equipped with a web browser so that a user of the digital television can control another device connected to the digital television, for example, a DVD player, by operating the web browser through a remote control.

In other words, in order to control various devices (hereinafter, referred to as "controlled devices") included in a home network, a device (hereinafter, referred to as "control device") capable of displaying a user interface, such as a digital television or a Personal Digital Assistant (PDA), is equipped with a web browser, so as to connect to a web server mounted in each of the controlled devices in order to control the controlled devices.

The control device provides a user interface for a predetermined controlled device, and a user can control the predetermined controlled device by using the user interface provided to the user. The control device may be equipped with user interfaces for controlling all controlled devices currently connected to the control device through the home network. However, the control device is not equipped with a user interface for a controlled device that is newly added to the home network, and it is thus necessary to download the user interface for the newly added controlled device in order to provide the new user interface to the user, which may be quite cumbersome.

Recently, even when a control device is not equipped with a user interface for a predetermined controlled device, the control device receives a user interface from a corresponding controlled device and provides the user interface to a user. Therefore, a user can control a corresponding controlled device even through a control device which is not equipped with a user interface for the corresponding controlled device.

Specifically, the control device connects with the web server of the controlled device through the web server of the control device and requests a user interface for control by a user to the controlled device through a Hyper Text Transfer Protocol (HTTP). In response to the request from the control device, the controlled device transmits the user interface to the control device through the HTTP. Then, the control device updates a currently displayed user interface to display the features of the user interface received from the controlled device.

Schemes for transmitting a user interface between a control device and a controlled device include an XMLHTTPRequest scheme, which is widely used in web server applications, such as Apache and IIS, and web browser applications, such as Internet Explore, Mozilla, Safari, etc.

The XMLHTTPRequest scheme is a scheme for transmission of a user interface,which is used in a single connection between a web browser and a web server. The XMLHTTPRequest scheme is effective in a system such as the Internet, in which events requested by the web browser do not frequently occur. However, when the event occurs, the XMLHTTPRequest scheme causes event delay or loss to occur and instant update of the user interface is necessary. Therefore, there has been a necessity for a scheme which can efficiently transmit an event without delay or loss even when events frequently occur.

Korean Laid-Open Patent No. 2005-0079480 discloses a home network service providing UPnP based RG system, which includes a central server (HNSN) connected to a mobile network to control devices and transfer control states of the devices, and a home gateway (RG) connected to multiple devices and to the central server. However, in the disclosed system, a user outside of a home network can remotely control all devices within the home network by using a browser. However, the Korean Laid-Open Patent fails to disclose a scheme for efficiently transmitting an event that occurred in a controlled device of a web-based system without delay or loss.

SUMMARY OF THE INVENTION

Accordingly, the present invention has been made to address the above-mentioned problems occurring in the related art, and an aspect of the present invention is to provide an apparatus and method for transmitting an event in a web-based system, in which a control device requests a controlled device to report an occurred event and re-requests the controlled device to report an occurred event whenever it receives the requested event, thereby preventing transmission delay or loss of the event even when the event frequently occurs.

Further to the above aspect, the present invention has additional technical aspects not described above, which can be clearly understood by those skilled in the art from the following description.

In order to accomplish these objects, there is provided an apparatus for transmitting an event in a web-based system, the apparatus including an event occurrence detector for detecting occurrence of an event; an event storage unit for storing an occurred event; a response transmitter for transmitting a first response including the occurred event to a control device according to a request from the control device; a time measurement unit for measuring time elapsed after the request or the response, and a control unit for transmitting a second response to the control device, which selectively asks the control device to re-request a report of an occurred event according to the measured time.

In another aspect of the present invention, there is provided an apparatus for receiving an event in a web-based system, the apparatus including an event request unit for transmitting a request for a report of an event that occurred in a controlled device to the control device; a response receiver for receiving a first response including an occurred event from the controlled device according to the request; and a control unit for re-requesting the controlled device to report an occurred event after receiving the first response.

In another aspect of the present invention, there is provided a method of transmitting an event in a web-based system, the method including detecting occurrence of an event; storing an occurred event; transmitting a first response including the occurred event to a control device according to a request from the control device; measuring an elapsed time after the request or the response, and transmitting a second response to the control device, which selectively asks the control device to re-request a report of an occurred event according to the measured time.

In another aspect of the present invention, there is provided a method of receiving an event in a web-based system, the method including transmitting a request for a report of an event that occurred in a controlled device to the control device; receiving a first response including an occurred event from the controlled device according to the request; and re-requesting the controlled device to report an occurred event after receiving the first response.

Particulars of other exemplary embodiments are incorporated in the following description and attached drawings.

BRIEF DESCRIPTION OF THE DRAWINGS

The above and other aspects of the present invention will be more apparent from the following detailed description taken in conjunction with the accompanying drawings, in which.

DETAILED DESCRIPTION OF EXEMPLARY EMBODIMENTS OF THE INVENTION

Aspects of the present invention, and ways to achieve them will be apparent from the exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

The exemplary embodiments of the present invention are described hereinafter with reference to block diagrams or flowcharts for illustrating apparatuses and methods for transmitting an event in a web-based system according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

Hereinafter, preferred exemplary embodiments of the present invention will be described with reference to the accompanying drawings.

Figure 1:
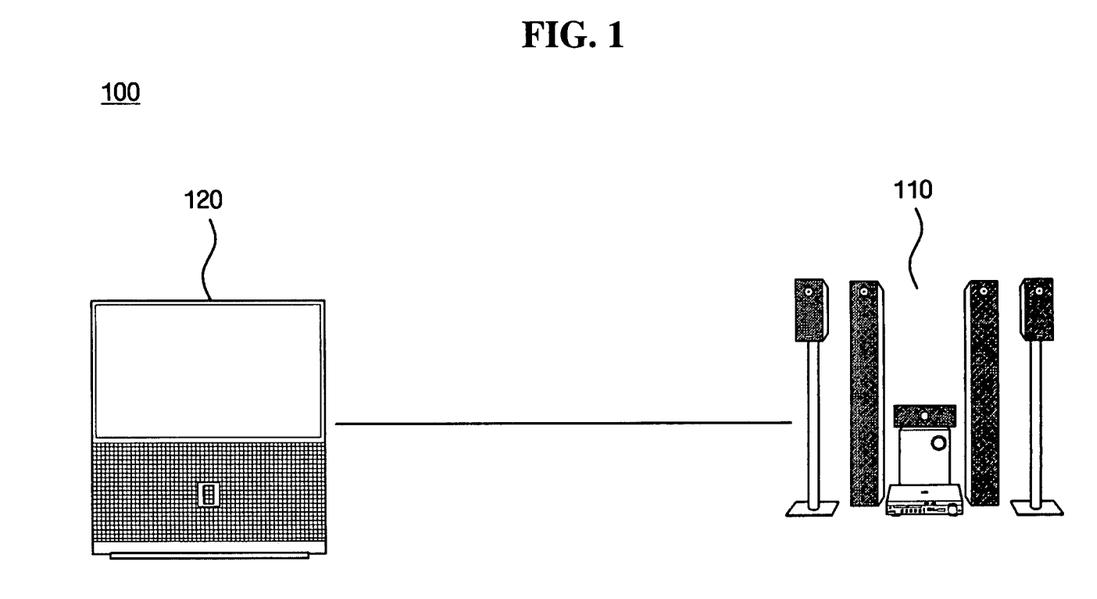
FIG. 1 is a view illustrating a web-based system according to an exemplary embodiment of the present invention.

FIG. 1 is a view illustrating a web-based system according to an exemplary embodiment of the present invention.

As shown, the web-based control system 100 according to an exemplary embodiment of the present invention includes a controlled device 110 and a control device 120.

In the present exemplary embodiment, the controlled device 110 has a web server which can receive a predetermined request through a Hyper Text Transfer Protocol (HTTP) from the control device 120, process a task according to the received request, and transmit a result of the task through the HTTP back to the control device 120. The control device 120 has a web browser for controlling the controlled device 110, which can transmit a predetermined request to the web server of the controlled device 110 and can receive a response to the request from the web server of the controlled device 110 through the HTTP.

The web server can transmit a response, which includes an event that occurred in the web server in response to the request from the web browser, to the web browser through the HTTP, and the web browser can receive updated information from the web server without using a separate reload command. In this way, an XMLHTTPRequest scheme as described above may be used for transmission of the event.

Figure 2:
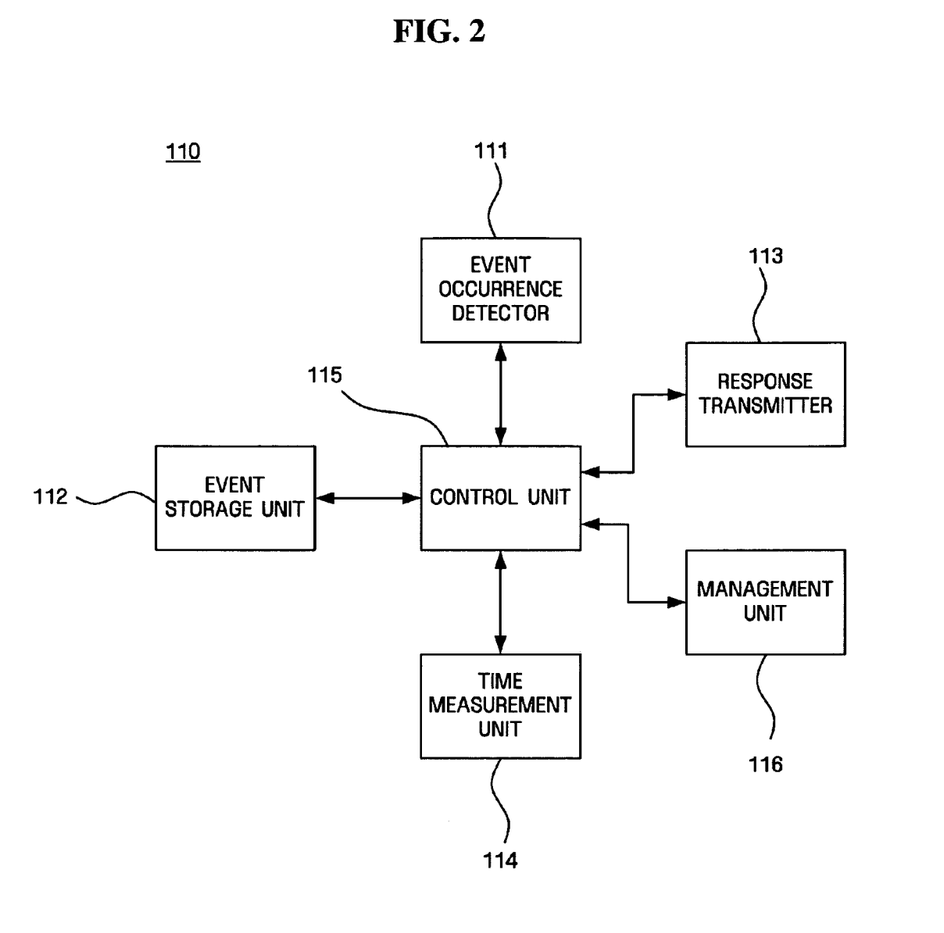
FIG. 2 is a block diagram of the controlled device according to an exemplary embodiment of the present invention.

FIG. 2 is a block diagram of the controlled device according to an exemplary embodiment of the present invention.

As shown, the controlled device 110 according to an exemplary embodiment of the present invention includes an event occurrence detector 111 for detecting an occurrence of a predetermined event, an event storage unit 112 for storing an occurred event, a response transmitter 113 for transmitting a first response including an occurred event to the control device 120 according to a request from the control device 120, a time measurement unit 114 for measuring the time elapsed after the request or the response, and a control unit 115 for transmitting a second response to the control device 120, which selectively asks the control device 120 to re-request a report of a detected event according to the measured time.

The event occurrence detector 111 may detect an occurrence of an event either by a request of the control device 120 or according to a change that occurred in the controlled device 110 itself. For example, if the controlled device 110 is a DVD player and a value input by a user in order to control the controlled device 110 or the status of the controlled device 110 itself has changed from "reproduction" to "stop," the event occurrence detector 111 can detect the occurrence of an event corresponding to such a change. The occurred event can be applied to a user interface transmitted from the controlled device 110 to the control device 120.

The event storage unit 112 can store an event detected by the event occurrence detector 111. When the first response including the occurred event has been transmitted to the control device 120 by the response transmitter 113, the event storage unit 112 can delete the stored event.

When a request for a report of the occurred event has not been received from the control device 120, the event storage unit 112 can store a plurality of events which have occurred before the request for the report of the occurred event is received. Therefore, when multiple events have occurred in the controlled device 110, the occurred events are stored until a request for a report of the occurred events from the control device 120 is received, thereby preventing the loss of an occurred event.

When the response transmitter 113 has received a request for a report of the occurred event from the control device 120, the response transmitter 113 may transmit to the control device 120 the first response including the events which have been stored in the event storage unit 112 before the request for a report of the occurred event is received.

When the response transmitter 113 has received requests for a report of the occurred events from multiple control devices, the response transmitter 113 may transmit the first response including the occurred events to the multiple control devices with reference to a management table for control of transmission of the first response.

Therefore, the controlled device 110 according to an exemplary embodiment of the present invention may further include a management unit 116 for managing a management table to which the response transmitter 113 refers when it transmits the first response.

Figure 3:
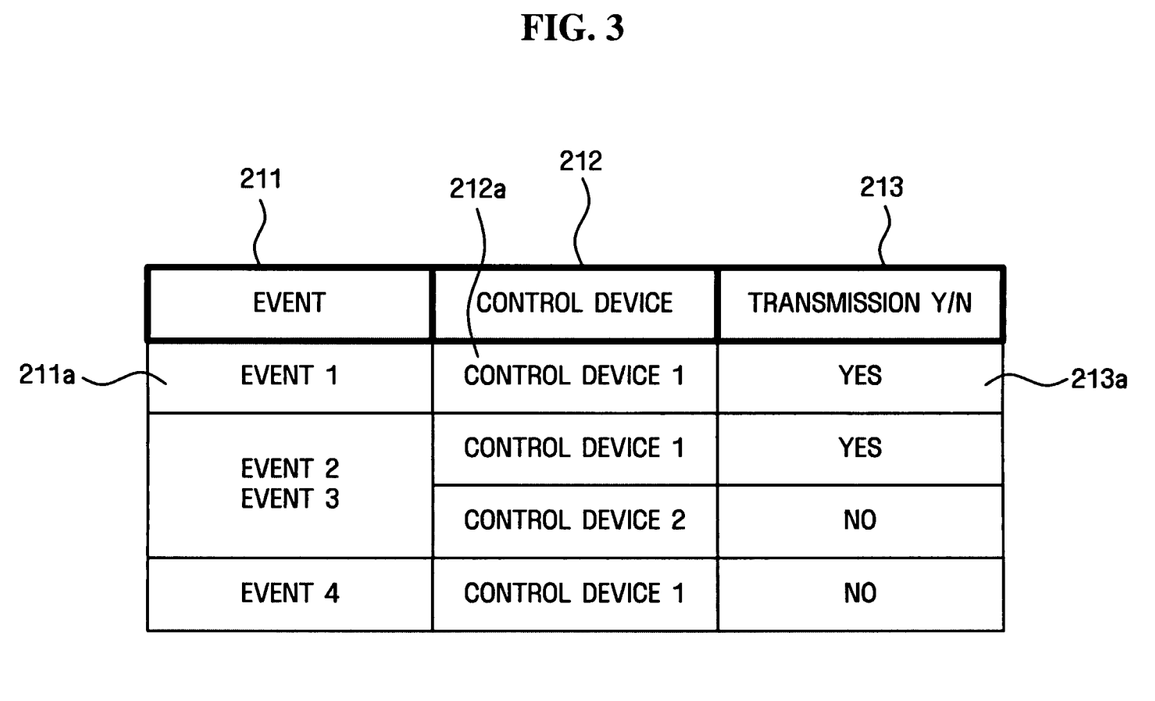
FIG. 3 illustrates a management table according to an exemplary embodiment of the present invention.

As shown in FIG. 3, the management table managed by the management unit 116 includes an event field 211 for indicating an event that occurred in the controlled device 110, a control device field 212 for indicating a control device which requested a report of the event, and a transmission Y/N field 213 for indicating if the first response including the occurred event has been transmitted to each control device. Although the management table shown in FIG. 3 includes the event field 211, the control device field 212, and the transmission Y/N field 213, these fields are only an example and used in order to assist in understanding the present invention. Thee number and types of the fields in the management table may vary.

A predetermined cell 211a of the event field 211 in the management table indicates the events that occurred in the controlled device 110 before the control device 120 requests a report of the occurred events. Therefore, when multiple events have occurred before the control device 120 requests a report of the occurred events, the cell 211a of the event field 211 may indicate multiple events.

A predetermined cell 212a of the control device field 212 in the management table may include identification information (for example, an identifier) for identifying the control device which requested a report of the occurred event included in the cell 211 a of the event field 211, and may include identification information of all control devices that have requested a report of the event. Therefore, the transmission Y/N field 213 includes a plurality of cells, each of which indicates if a predetermined event requested by a predetermined control device has been transmitted to the control device. The following description is based on an assumption that, in each cell of the transmission Y/N field 213, "YES" is recorded when the predetermined event has been transmitted to the control device and "NO" is recorded when the predetermined event has not been transmitted to the control device.

Therefore, it is noted from FIG. 3 that, for control device #1 and control device #2 which requested event #2 and event #3, event #2 and event #3 have been transmitted to control device #1 while they have not been transmitted to control device #2.

Figure 4:
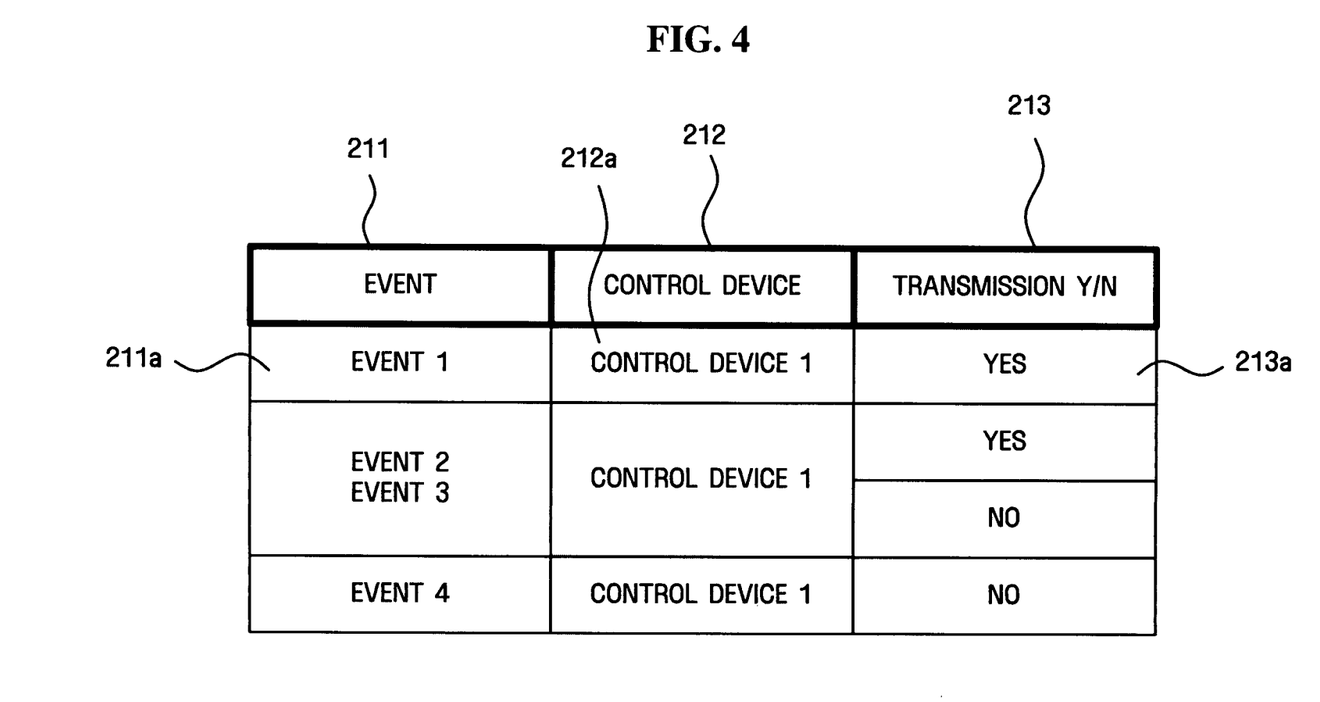
FIG. 4 illustrates the management table of FIG. 3 after control device #2 is deleted.

Meanwhile, when a predetermined control device has been disconnected from the network, the management unit 116 may delete the control device which was disconnected from the network from the management table. For example, when control device #2 has been disconnected from the network corresponding to the management table shown in FIG. 3, control device #2 is deleted from the management table as shown in FIG. 4.

When no event occurs during a predetermined time interval after the request for a report of an occurred event from the control device 120 is received, the control unit 115 may transmit a second response to the control device 120, which asks the control device 120 to re-request an occurred event.

Specifically, the time measurement unit 114 can measure the time lapsed from the time when the request from the control device 120 has been received, and the control unit 115 can control the response transmitter 113 to transmit the second response to the control device 120, which asks the control device 120 to re-request an occurred event when a first time interval has passed after the previous request from the control device 120 is received, based on the time measured by the time measurement unit 114.

Further, when a predetermined control device 120 does not request a report of an occurred event during a predetermined time interval after the first response or the second response is transmitted to the control device 120, the control unit 115 can determine that the control device has been disconnected from the network.

Specifically, the time measurement unit 114 can measure the time elapsed after the first response or the second response has been transmitted from the response transmitter 113 to the control device 120. Then, if the control device 120 does not request an occurred event before a second time interval has passed after the first response or the second response is transmitted, based on the time measured by the time measurement unit 114, the control unit 115 can determine that the control device has been disconnected from the network. When the control unit 115 determines that the control device has been disconnected from the network, the management unit 116 can delete the control device from the management table. The management table after the been disconnected control device is deleted is as shown in FIG. 4.

Figure 5:
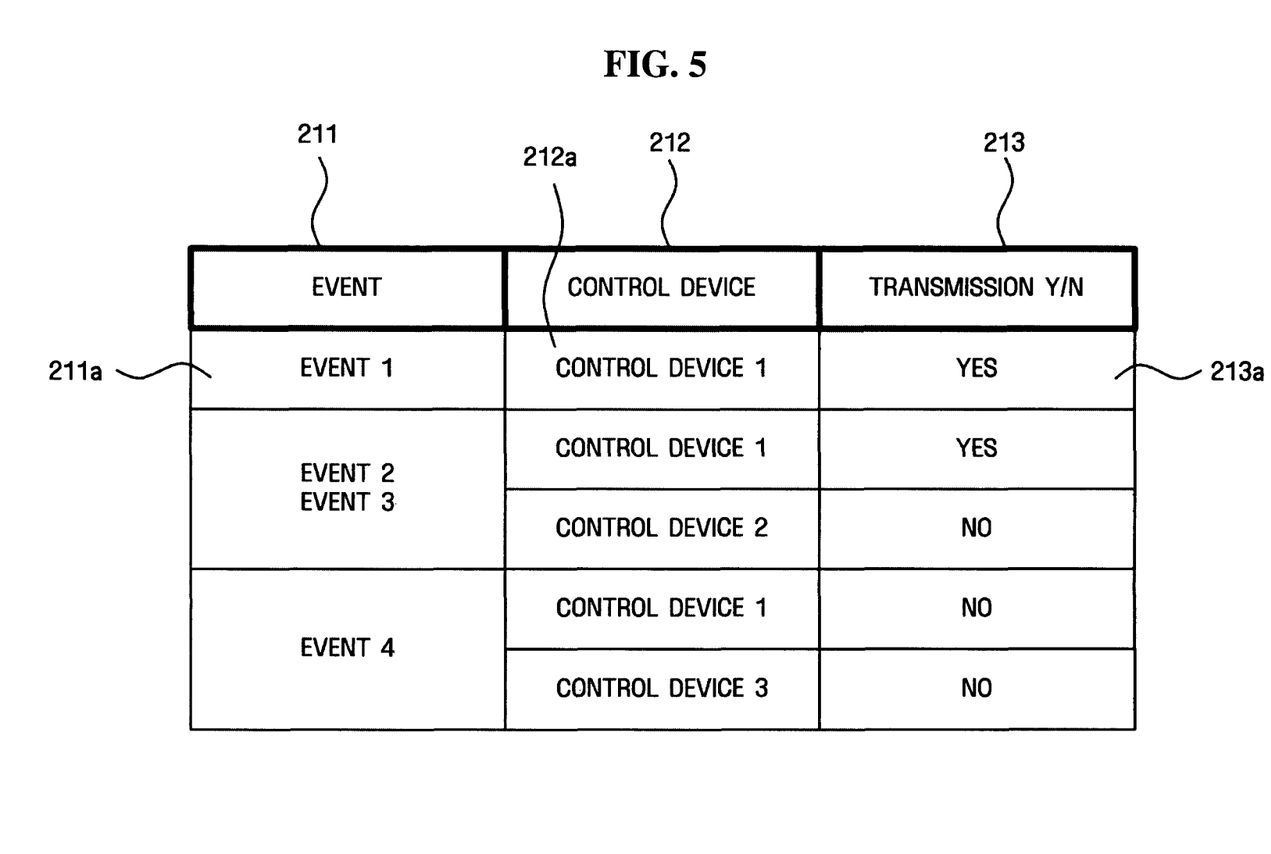
FIG. 5 illustrates the management table of FIG. 3 after control device #3 is added.

In contrast, when a new control device which is not included in the existing management table requests an occurred event, the management unit 116 can add the new control device to the management table. For example, when a new control device #3, which is not found in the management table of FIG. 3, requests event #4, the new control device #3 which requested event #4 is added into the management table as shown in FIG. 5.

Figure 6:
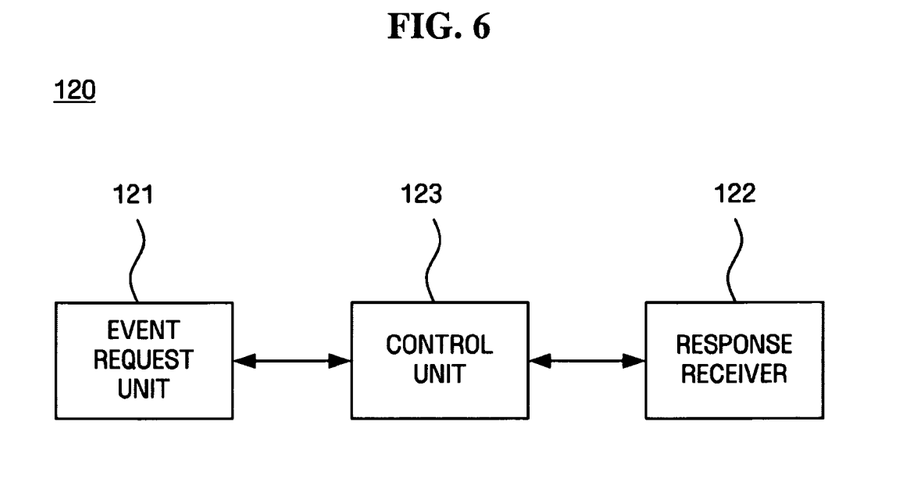
FIG. 6 is a block diagram of a control device according to an exemplary embodiment of the present invention.

FIG. 6 is a block diagram of a control device according to an exemplary embodiment of the present invention.

As shown, the control device 120 according to an exemplary embodiment of the present invention includes an event request unit 121 for requesting the controlled device 110 to report an occurred event, a response receiver 122 for receiving a first response which includes an occurred event from the controlled device 110, and a control unit 123 for re-requesting the controlled device 110 to report an occurred event according to the received first response.

The response receiver 122 receives the first response, which includes an event that occurred in the controlled device 110, and is transmitted in response to a request from the event request unit 121, and the second response, which asks the control device 120 to re-request a report of a detected event when no event occurs in the controlled device 110 during a predetermined time interval.

Therefore, the control unit 123 controls the event request unit 121 to not only request an event after receiving the first response from the controlled device 110 but also re-request an event after receiving the second response from the controlled device 110. At this time, the control unit 123 controls the event request unit 121 to request an occurred event from the controlled device 110 only when it has received the first response or the second response. Therefore, it is unnecessary for the control unit 123 to periodically request a report of an event that occurred in the controlled device 110 in order to receive the event and is thus possible to prevent the load on the system from increasing.

The second response may be received when no event has occurred during a predetermined time interval after the previous request for an occurred event from the control device 120 is received.

Figure 7:
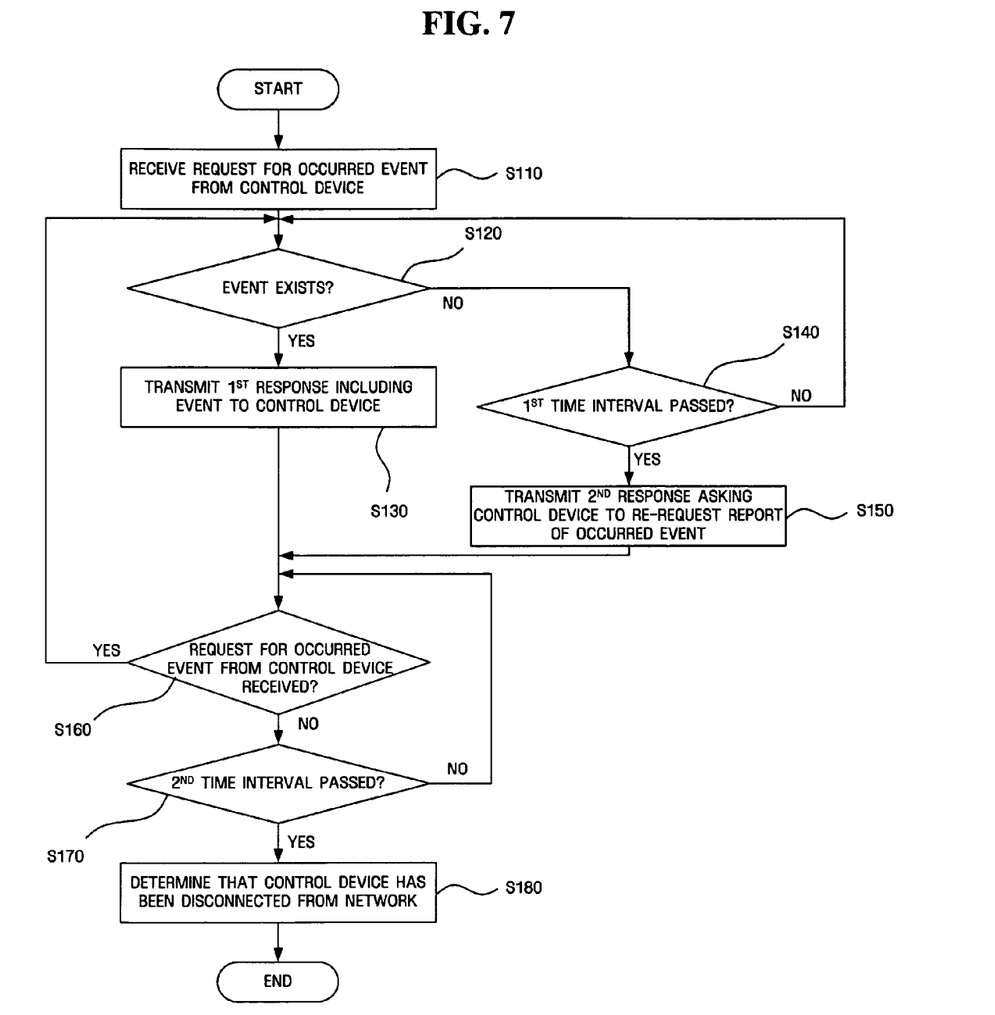
FIG. 7 is a flowchart of a process for transmission of an event according to an exemplary embodiment of the present invention.

FIG. 7 is a flowchart of a process for transmission of an event according to an exemplary embodiment of the present invention.

As shown, according to the process for transmission of an event according to an exemplary embodiment of the present invention, the controlled device 110 first receives a request for a report of an occurred event from the control device 120 (operation S110). The following description is based on an example in which the request for the event received in operation S110 corresponds to a request which is received after a first response is transmitted to the control device 120, the first response including an occurred event, and made according to a request for the occurred event by the control device 120.

When there is at least one event stored in the event storage unit 112 (operation S120), the response transmitter 113 transmits a first response including the occurred event or events to the control device 120 (operation S130).

The events stored in the event storage unit 112 can be understood as the events detected by the event occurrence detector 111, and the event occurrence detector 111 can store the events detected before a request for an occurred event from the control device 120 is received.

Meanwhile, when no event occurs within a first time interval after the request for a report of an occurred event from the control device 120 is received (operation S140), the control unit 115 controls the response transmitter 113 to transmit the second response to the control device 120, which asks the control device 120 to re-request a report of an occurred event (operation S150).

As long as the controlled device 110 and the control device 120 belong to the network, operations S110 to S150 are repeatedly performed.

When the control device 120 has been disconnected from the network, the controlled device 110 cannot receive a request for a report of an event from the disconnected control device 120 anymore. Therefore, after the first response or the second response is transmitted to the control device 120, the control unit 115 determines if a request for a report of an occurred event from the control device 120 is received (operation S160). When a request for a report of an occurred event from the control device 120 is not received during a second time interval (operation S170), the control unit 115 determines that the corresponding control device has been disconnected from the network (operation S180). When it is determined that the corresponding control device has been disconnected from the network, the corresponding control device is deleted from a management table for the network.

Figure 8:
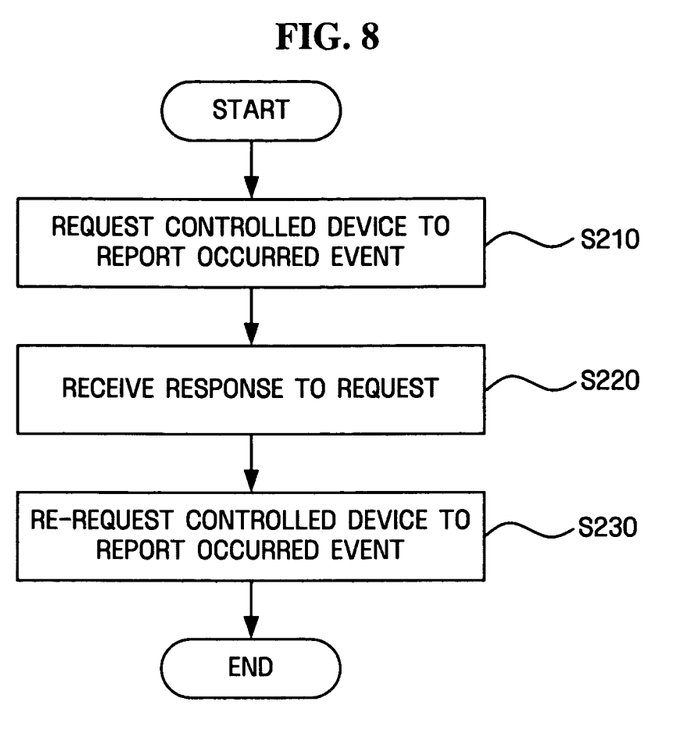
FIG. 8 is a flowchart of a process for reception of an event according to an exemplary embodiment of the present invention.

FIG. 8 is a flowchart of a process for reception of an event according to an exemplary embodiment of the present invention.

As shown in FIG. 8, according to the process for reception of an event according to an exemplary embodiment of the present invention, the event request unit 121 first requests the controlled device 110 to report an occurred event (operation S210).

The event request unit 121 may request an occurred event when it has received either a first response including an occurred event from the controlled device 110 in response to a previous request for an occurred event or a second response which asks the control device 120 to re-request a report of an occurred event due to absence of an occurred event in the controlled device 110 during a predetermined time interval.

The response receiver 122 receives a response to the request for a report of an occurred event by the event request unit 121 (operation S220).

After receiving the response, the control unit 123 controls the event request unit 121 to re-request the controlled device 110 to report an occurred event (operation S230).

When the received response is the first response, the control unit 123 may process the event included in the first response and then provide the processed event to the user. In contrast, when the received response is the second response, the control unit 123 may ask the controlled device 110 again to report an occurred event, because the second response does not include an occurred event.

Figure 9:
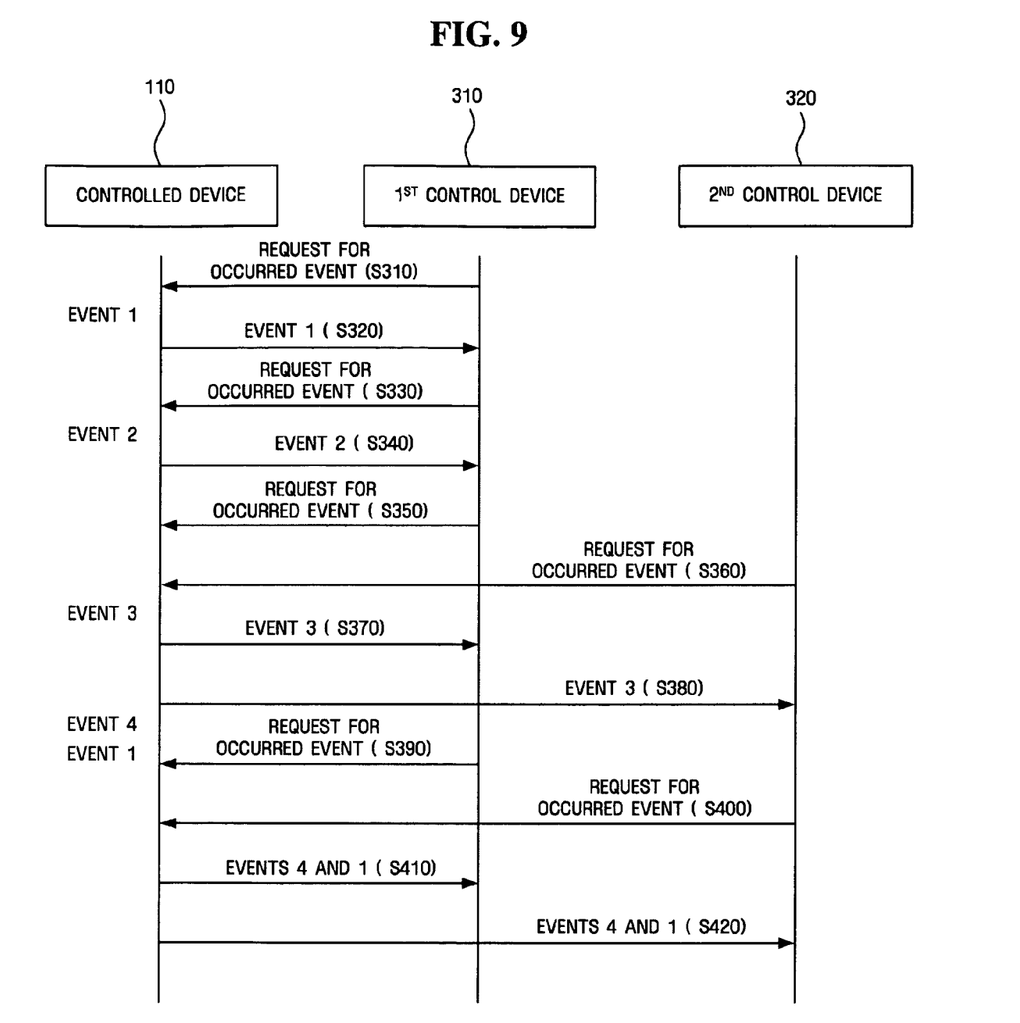
FIG. 9 is a flowchart of event transmission between control devices and a controlled device according to an exemplary embodiment of the present invention.

FIG. 9 is a flowchart of event transmission between control devices and a controlled device according to an exemplary embodiment of the present invention. FIG. 9 is based on an example in which multiple control devices including a first control device and a second control device request a single controlled device to report an occurred event. The first control device and the second control device can be understood to have the same construction as that of the control device 120 described above.

As shown in FIG. 9, the first control device 310 first requests the controlled device 110 to report an occurred event (operation S310). In response to the request from the first control device 310, the controlled device 110 transmits a first response including event #1 to the first control device 310 (operation S320).

After receiving the first response including event #1, the first control device 310 again requests the controlled device 110 to report an occurred event (operation S330). Then, the controlled device 110 transmits the first response including the occurred event (event #2) to the first control device 310 (operation S340).

After receiving the first response including event #2, the first control device 310 requests the controlled device 110 again to report an occurred event (operation S350). According to the present exemplary embodiment, when the first control device 310 requests the controlled device 110 to report an occurred event in operation S350, the second control device 320 also requests the controlled device 110 to report an occurred event. In other words, the second control device 320 also requests the controlled device 110 to report an occurred event in operation S360.

The controlled device 110 transmits a first response including an occurred event (event #3) to the first control device 310 and the second control device 320 in response to the requests from the first control device 310 and the second control device 320, respectively (operations S370 & S380).

After receiving the first response including event #3, the first control device 310 and the second control device 320 request the controlled device 110 again to report an occurred event (operations S390 & S400).

Then, because event #4 and event #1 have occurred in the controlled device 110, the controlled device 110 transmits a first response including occurred events (event #4 and event #1) to the first control device 310 and the second control device 320 (operations S410 & S420).

Meanwhile, when no event has occurred during the first time interval in spite of a request for a report of an occurred event after the first control device 310 and the second control device 320 receive the first response including event #4 and event #1, the controlled device 110 transmits a second response to the first control device 310 and the second control device 320, which asks the first control device 310 and the second control device 320 to re-request a report of an occurred event.

Further, when there has been no request for a report of an occurred event from the first control device 310 and the second control device 320 during the second time interval after the controlled device 110 transmitted the first response including event #4 and event #1, the controlled device 110 determines that the first control device 310 and the second control device 320 have been disconnected from the network, and deletes identification information of the first control device 310 and the second control device 320 from a management table managed by the management unit 116.

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

According to the apparatus and method for transmitting an event in a web-based system as described above, it is possible to prevent transmission delay or loss of the event even when the event frequently occurs.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for transmitting events in a web-based system, the apparatus comprising:
   an event occurrence detector configured to detect an occurrence of each of the events;
   an event storage unit configured to store each of the occurred events;
   a response transmitter configured to transmit a first response including at least one event of the occurred events to a control device according to a request from the control device;
   a time measurement unit configured to measure a time elapsed after the request or the response, and
   a control unit configured to transmit a second response to the control device, which selectively asks the control device to re-request a report of another of the occurred events according to the measured time,
   wherein the apparatus is configured to operate as a controlled device in the web-based system, and
   wherein when a request for a report of an occurred event has not been received from the control device, multiple events are stored and simultaneously transmitted when the request is received.

2. The apparatus of claim 1, wherein the control device is configured to receive at least one of the first response and the second response and re-requests a report of the another of the occurred events.

3. The apparatus of claim 1, wherein the response transmitter is configured to transmit the first response to the control device, the first response comprising the at least one event which has been stored in the event storage unit before the control device requests a report of an occurred event.

4. The apparatus of claim 1, wherein the time measurement unit is configured to measure the time lapsed after the control device requests the report of the at least one event of the occurred events, and the control unit is configured to transmit the second response to the control device, which asks the control device to re-request the report of the another occurred event, when no event has occurred during a first time interval after a previous request from the control device is received.

5. The apparatus of claim 1, wherein the time measurement unit is configured to measure the time lapsed after the first response or the second response is transmitted to the control device, and the control unit is configured to determine that the control device has been disconnected from a network when the control device has not requested a report of the occurred events during a second time interval after the first response or the second response is transmitted to the control device.

6. The apparatus of claim 1, further comprising a management unit which is configured to manage transmission of the at least one event to each of one or more control devices which have requested a report of the occurred event.

7. The apparatus of claim 6, wherein the management unit is configured to generate a management table for managing transmission of an event to each of the control devices, and the management table comprises a first field for indicating an event that occurred in the controlled device, a second field for indicating a control device which requested report of the occurred event, and a third field for indicating if the occurred event has been transmitted to each control device.

8. An apparatus for receiving events that occurred in a controlled device in a web-based system, the apparatus comprising:
an event request unit configured to transmit a request for a report of at least one event that occurred in the controlled device to the controlled device;
a response receiver configured to receive a first response including the at least one occurred event from the controlled device according to the request; and
a control unit configured to re-request the controlled device to report another occurred event of the at least one event after receiving the first response,
wherein the apparatus is configured to operate as a control device in the web-based system, and
wherein when a request for a report of an occurred event has not been received from the control device, multiple events are stored and simultaneously transmitted when the request is received.

9. The apparatus of claim 8, wherein the first response comprises at least one event which occurred before the controlled device receives the request.

10. The apparatus of claim 8, wherein the response receiver is configured to receive a second response, which asks the apparatus to re-request a report of the occurred event, when no event occurs in the controlled device during a predetermined time interval after the controlled device receives the request.

11. The apparatus of claim 9, wherein the control unit is configured to re-request the controlled device to report an occurred event, after receiving a second response.

12. A method of transmitting, by a controlled device, events in a web-based system, the method comprising:
detecting an occurrence of at least one event in the controlled device;
storing the at least one occurred event in the controlled device;
transmitting a first response including the at least one occurred event to a control device according to a request of the control device;
measuring a time elapsed after the request or the response, and
transmitting a second response to the control device, which selectively asks the control device to re-request a report of another of the at least one occurred event according to the measured time,
wherein when a request for a report of an occurred event has not been received from the control device, multiple events are stored and simultaneously transmitted when the request is received.

13. The method of claim 12, wherein, when the control device has received at least one of the first response and the second response, the control device re-requests a report of the another occurred event.

14. The method of claim 12, wherein, in transmitting the first response, the first response transmitted to the control device comprises the at least one event which has been stored before the control device requests a report of the occurred event.

15. The method of claim 12, wherein the measuring of the time comprises measuring the time lapsed after the control device requests report of the at least one occurred event, and the transmitting of the second response comprises transmitting the second response to the control device, which asks the control device to re-request the another occurred event, when no event has occurred during a first time interval after a previous request from the control device is received.

16. The method of claim 12, wherein the measuring of the time comprises measuring the time lapsed after the first response or the second response is transmitted to the control device, and the transmitting of the second response comprises determining that the control device has been disconnected from a network when the control device does not request a report of an occurred event during a second time interval after the first response or the second response is transmitted to the control device.

17. The method of claim 12, which further comprises managing transmission of an event to each of one or more control devices which have requested a report of the occurred event.

18. The method of claim 17, wherein the managing of the transmission of an event comprises generating a management table for managing transmission of the occurred event to each of the control devices.

19. The method of claim 18, wherein the management table comprises a first field for indicating the occurred event in the controlled device, a second field for indicating a control device which requested report of the occurred event, and a third field for indicating if the occurred event has been transmitted to each control device.

20. A method of receiving, by a control device, an event in a web-based system, the method comprising:
transmitting, by the control device, a request for a report of at least one event that occurred in a controlled device to the controlled device;
receiving a first response including the occurred event from the controlled device according to the request; and
re-requesting the controlled device to report another of the at least one occurred event after receiving the first response,
wherein when a request for a report of an occurred event has not been received from the control device, multiple events are stored and simultaneously transmitted when the request is received.

21. The method of claim 20, wherein the first response comprises the at least one event that occurred before the controlled device receives the request.

22. The method of claim 20, wherein the receiving of the first response comprises receiving a second response, which asks a re-request for a report of the occurred event, when no event occurs in the controlled device during a predetermined time interval after the controlled device receives the request.

23. The method of claim 22, wherein the re-requesting of the controlled device to report the occurred event comprises re-requesting the controlled device to report the another occurred event, after receiving the second response.

* * * * *